United States Patent [19]

Fultz

[11] Patent Number: 5,489,176

[45] Date of Patent: Feb. 6, 1996

[54] MALE CLINCH FASTENER WITH COLD-FORMED LOCKING FLANGE AND ASSOCIATED INSTALLATION METHOD

[75] Inventor: Robb M. Fultz, Huntington, Ind.

[73] Assignee: Emhart Inc., Newark, Del.

[21] Appl. No.: 110,446

[22] Filed: Aug. 23, 1993

[51] Int. Cl.⁶ ............................. F16B 37/02; F16B 37/04; F16B 39/00

[52] U.S. Cl. ........................ 411/181; 411/107; 411/173; 29/432.2; 29/524.1

[58] Field of Search ................................. 411/173, 177, 411/179, 180, 181, 107; 29/432.2, 524.1, 525.2

[56] References Cited

U.S. PATENT DOCUMENTS

| | | | |
|---|---|---|---|
| 3,381,362 | 5/1968 | Church et al. | 411/181 X |
| 3,535,678 | 10/1970 | Gulistan | 411/183 |
| 4,825,527 | 5/1989 | Ladouceur | 411/179 X |
| 4,966,512 | 10/1990 | Takaku | 411/181 |

FOREIGN PATENT DOCUMENTS

| | | | |
|---|---|---|---|
| 892554 | 3/1962 | United Kingdom | 29/432.2 |

*Primary Examiner*—Neill R. Wilson
*Attorney, Agent, or Firm*—E. D. Murphy

[57] ABSTRACT

A male clinch fastener adapted to be secured to a sheet by cold-forming includes a generally cylindrical head having a threaded shaft extending outwardly therefrom and a plurality of circumferentially distributed splines. Longitudinally extending portions of the splines are adapted to be displaced by cold-forming or a peeling action to form a laterally extending flange along a medial portion of the head. The clinch fastener also preferably includes a laterally extending flange at one end cooperating with the cold-formed flange to secure the fastener within a pilot, or collar, formed at an opening in the sheet to which the clinch bolt is secured. The splines adjacent the end flange are also secured within the pilot of the sheet and prevent rotation of the clinch fastener. The head also preferably has a second end portion being tapered to serve as a guide surface to facilitate alignment with an opening in the sheet during installation, and also serves as a guide surface for beginning the cold-forming, or peeling, of the splines to form the flange in the medial portion of the head.

52 Claims, 3 Drawing Sheets

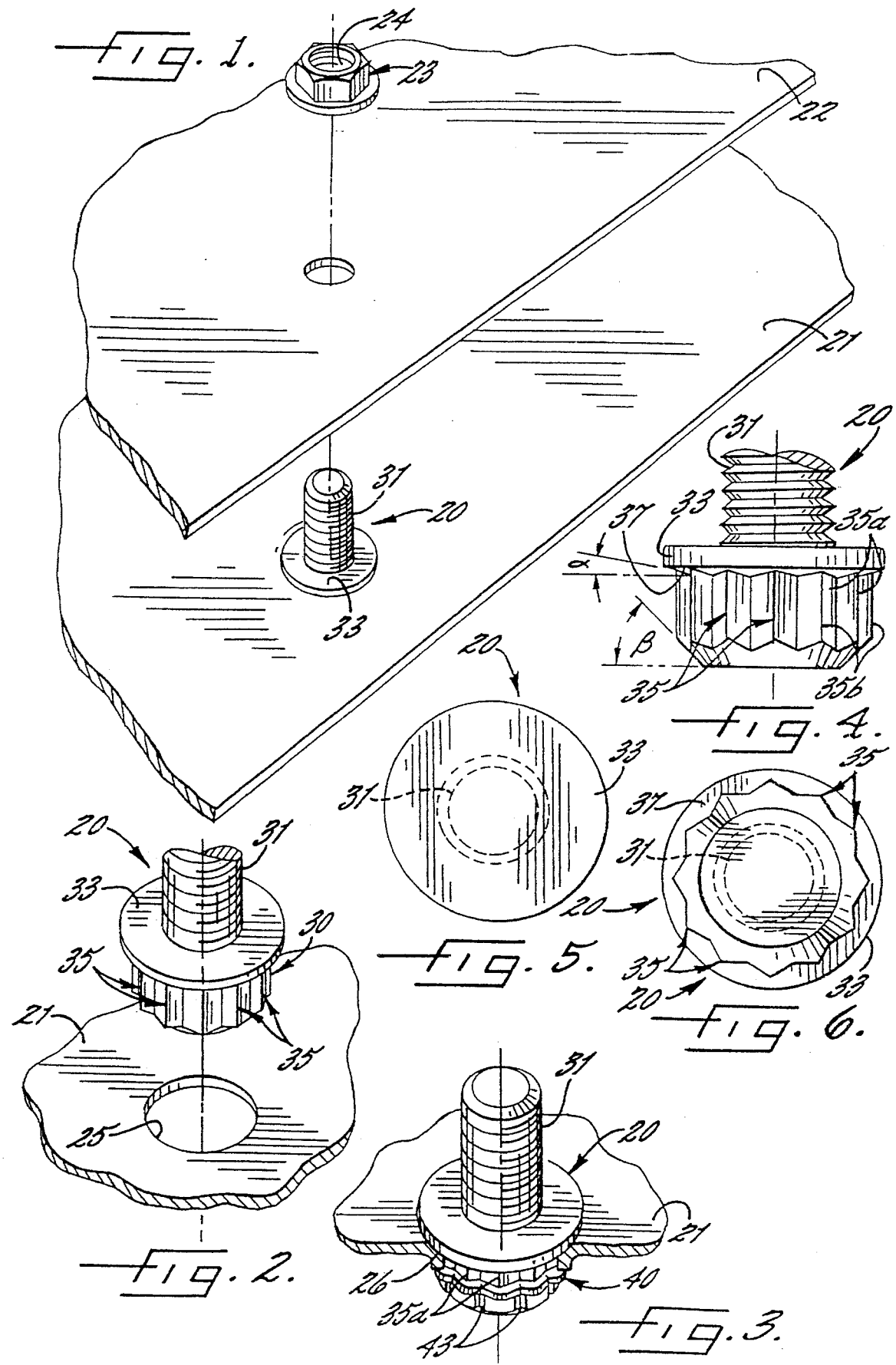

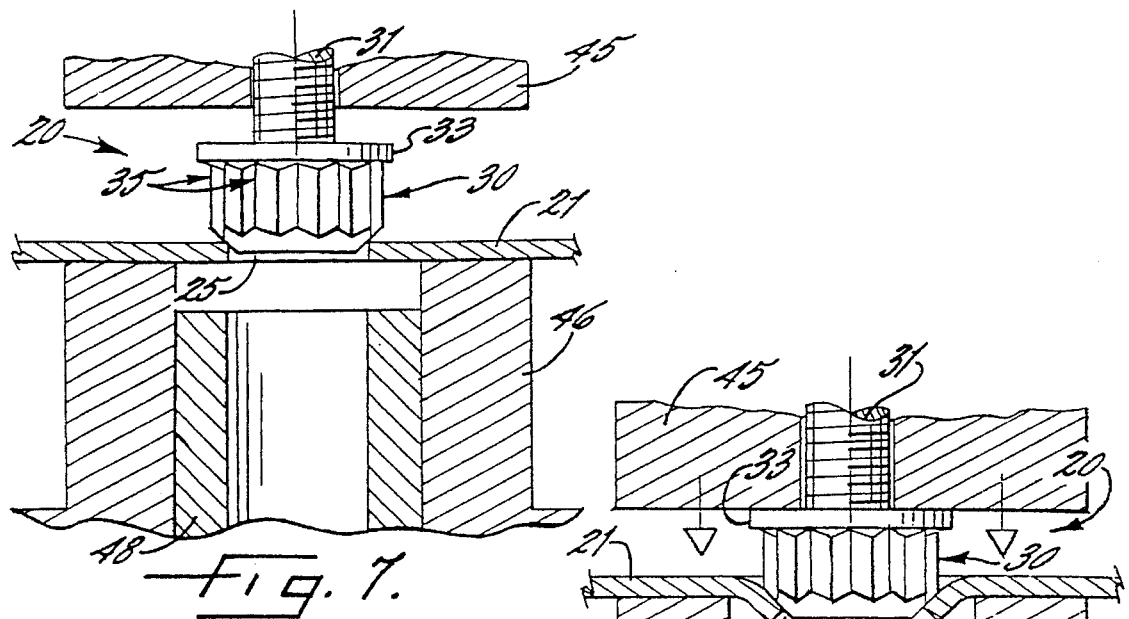
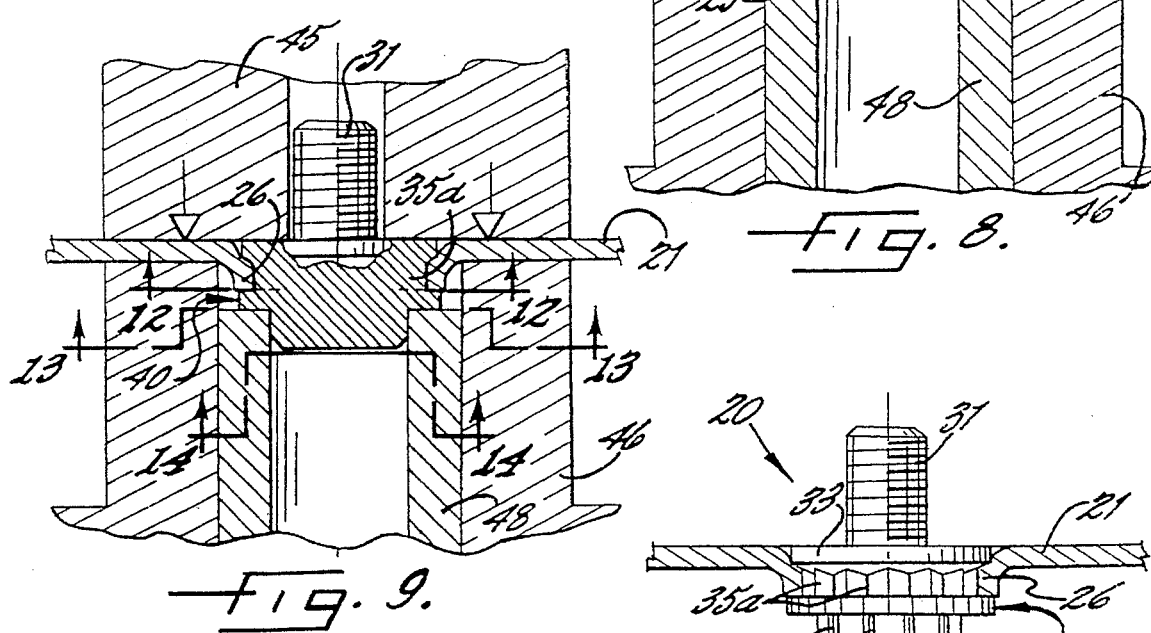
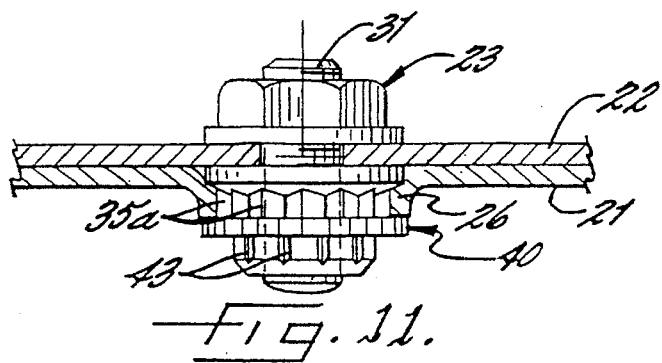

1

MALE CLINCH FASTENER WITH COLD-FORMED LOCKING FLANGE AND ASSOCIATED INSTALLATION METHOD

FIELD OF THE INVENTION

The invention relates to the field of fasteners, and, more particularly, to a male clinch fastener, or clinch bolt, mounted to a sheet and an associated method for installing the clinch fastener.

BACKGROUND OF THE INVENTION

A conventional male clinch fastener, or clinch bolt, is permanently installed into a portion of a metal sheet so that the head becomes an integral part of the metal sheet and the threaded shaft extends upwardly from the sheet. The clinch bolt is installed by cold-forming the metal of the sheet or the head, rather than welding. The clinch bolt thus provides a threaded shaft with greater holding capacity than could be obtained by simply threading a conventional bolt through an opening in the sheet metal alone. Such a clinch bolt is commonly used in automobiles to provide a means for securing other objects to a metal sheet, for example.

One type of conventional clinch bolt is offered by Multifastener Corporation of Detroit, Mich. under the designation PIERCEFORM® SBK Stud. The bolt includes a head having an octagonal first portion adjacent the threaded shaft. A second portion of the head is a hollow tube with a smaller outer diameter than the first portion. As the bolt is inserted into an opening in the sheet, the sidewalls of the hollow tube are folded over and radially outwardly by a die to form a locking flange, while the octagonally shaped first portion is drawn into and flush with the sheet.

Unfortunately, the PIERCEFORM®SBK Stud is secured to the sheet by a-coining action or displacement of the parent material of the sheet. Thus, this clinch bolt may suffer from reduced pull-through and push-out performance.

The PIERCEFORM® Stud offered by Kean Manufacturing Corp. of Dearborn Heights, Mich. is a male fastener, or clinch bolt, having a threaded shaft extending outwardly from a generally cylindrical head, the head, in turn, is secured within a pilot, or collar, formed in the sheet. The PIERCEFORM® Stud forms, and then wraps around, a collar or pilot in the sheet into which the head has been pressed. A portion of the head is a hollow tube having walls that are folded over and radially outwardly by a die to form the locking flange. As the head is press fit into and through the sheet, edge portions of the sheet are bent downward to form the pilot for receiving the head of the bolt. A laterally extending flange on an end of the head adjacent the shaft is seated flush with the surface of the sheet. A relatively small number of circumferentially distributed ribs extend longitudinally along the first portion of the head to prevent rotational movement or torque-out of the nut.

The PIERCEFORM® Stud is a nondirectional clinch bolt, that is, it can be installed into a circular opening without concern for relative rotational orientation of the head of the bolt and the opening. In addition, this bolt offers improved performance characteristics over those conventional bolts described above which rely on the volumetric displacement or coining of parent material from the sheet.

Unfortunately, the PIERCEFORM® Stud suffers from a number of disadvantages including a relatively high cost of manufacture. Moreover, for a given bolt size, only a limited range of sheet material thicknesses and sizes of openings can be accommodated. In other words, since a predetermined portion of the tubular body is folded over for a given head size, the length of the pilot that can be effectively clamped between the first flange and the cold-formed flange must be accurately controlled.

The PIERCEFORM® Stud is also secured by the second metal flange which is formed by bending or folding a portion of the hollow head portion over the pilot formed in the sheet. This type of bending to cold-form the locking flange produces a relatively weak metal flange that may reduce pull-out performance.

In addition to male clinch fasteners, there are also female clinch fasteners, or clinch nuts. One such conventional clinch nut is available from RB&W Corporation of Mentor, Ohio, under the designation SPAC® nut. The SPAC® nut includes a back-tapered polygonal portion that is press fit into a slightly undersized opening in a sheet. The nut is locked into the sheet by a coining action as the sheet material flows to fill the space defined by the back-tapered portion, similar to the PIERCEFORM® SBK Stud described above. Also similar to the SPAC® nut are the STRUX-nut offered by Maclean-Fogg, and the HT-nut offered by NPR. Each of these clinch nuts relies upon the volumetric displacement of parent material from the sheet to fill an undercut or back-taper to create a kind of dove-tail joint between the fastener and the sheet. Unfortunately, such a clinch nut may not have sufficiently high performance characteristics, such as pull-through, push-out, and torque-out.

Yet another conventional clinch nut offered by the assignee of the present invention, requires that a hexagonal opening be punched into the sheet to accommodate the hexagonal body portion of the clinch nut. In other words, the clinch nut is a directional nut which requires proper orientation of the opening and proper alignment of the nut with the opening.

Another conventional clinch nut known commercially as the FLANGEFORM™ from RB&W, is disclosed in U.S. Pat. No. 4,018,257 to Jack entitled *Self-Flanging Nut and Joint Construction*. The FLANGEFORM™ clinch nut is similar to the PIERCEFORM® Stud as described above, and, accordingly, is subject to similar shortcomings.

SUMMARY OF THE INVENTION

In view of the foregoing background, it is therefore an object of the present invention to provide a high performance male clinch fastener, or clinch bolt, which is suitable for installation into a sheet having a range of thicknesses and opening sizes.

It is another object of the present invention to provide a high performance clinch bolt which is readily manufactured, relatively inexpensive, and easily installed into a sheet without regard to its rotational orientation with respect to the opening.

These and other objects, features, and advantages of the present invention are provided by a male clinch fastener including a generally cylindrical head having a plurality of circumferentially distributed splines, and wherein longitudinally extending portions of the splines are adapted to be displaced by cold-forming, or peeling, to form a laterally extending locking flange along a medial portion of the head. A threaded shaft extends outwardly from the head. The clinch fastener also preferably includes a laterally extending flange at one end adjacent the shaft that cooperates with the cold-formed locking flange to secure the fastener within a pilot, or collar, formed at an opening in a sheet. Accordingly, portions of the splines adjacent the end flange are also secured within the pilot to prevent rotation of the clinch fastener within the pilot.

The head preferably has a second end portion being tapered and having a smaller diameter transverse cross-section being axially outermost, and a larger diameter transverse cross-section defined by peripheral portions of the splines. The tapered second end serves as a guide surface to facilitate alignment with the opening in the sheet during installation of the fastener, serves to roll or form the pilot in the sheet, and also serves as a guide surface for beginning the cold-forming or peeling of the splines to form the locking flange in the medial portion of the head.

Because the cold-formed locking flange of the clinch fastener is formed by peeling a portion of the splines, the flange may be positioned within a range of longitudinal positions along the head. This capability allows the clinch fastener to accommodate a wide range of opening dimensions and sheet thicknesses, in contrast to the fairly limited ranges available using conventional fasteners, such as the PIERCEFORM® Stud fastener.

The head, the shaft, the first flange and the splines are preferably integrally formed of metal, while the second flange is cold-formed metal displaced from a portion of the splines on the head. Cold-forming of the metal by the peeling action produces a harder and stronger metal flange. In addition, the metal is preferably selected from the group consisting of low carbon steel, medium carbon steel, and heat treated medium carbon steel. The sheet may preferably be metal, however, the sheet may also be plastic, such as polyethylene, as would be readily understood by those skilled in the art. The circumferentially distributed splines permit the opening in the sheet to be circular, thus, eliminating a requirement for rotationally orienting the clinch fastener with respect to the sheet as part of the installation process.

The plurality of splines preferably define a polygonal transverse cross-sectional shape. In one embodiment of the male clinch fastener, the splines define a star-like transverse cross-sectional shape. In another embodiment, the splines preferably define a serpentine or sinuous generally circular transverse cross-sectional shape. Both such transverse cross-sectional shapes may be readily formed by conventional cold-forming techniques as would be appreciated by those skilled in the art. In addition, the plurality of splines is preferably a predetermined number in a range of about 8 to 16, and more preferably about 12, for typical commercially desired fastener sizes.

The clinch fastener, when installed into an opening of a sheet, produces a pilot or collar by deforming the sheet material adjacent the opening. The pilot depends from the sheet and cooperates with the first and second laterally extending flanges of the clinch bolt to provide excellent pull-through and push-out characteristics for the clinch fastener. The second or cold-formed flange abuts an end portion of the pilot. The first or end flange of the clinch fastener also preferably has an inwardly tapered annular surface transverse to the head for facilitating flush mounting of the flange with the sheet.

After the clinch fastener is installed and the second flange formed, the head has a second portion extending longitudinally outward from the second flange and from which a portion of the splines have been displaced, or peeled, to form the flange. In other words, this second portion of the head has a transverse cross-sectional diameter less than a predetermined diameter defined by peripheral portions of the splines. Accordingly, this second portion of the head also has circumferentially distributed longitudinally extending grooves in alignment with respective grooves defined by the plurality of splines remaining on a first portion of the head and secured within the pilot formed in the sheet. In addition, the cold-formed flange may preferably take the form of a plurality of radially outwardly extending bulbous protrusions longitudinally aligned with respective splines.

A method aspect of the present invention is for securing the male clinch fastener to a sheet. The clinch fastener is as described above and includes a shaft and a head, with a first laterally extending flange at an end of the head adjacent the shaft, and plurality of longitudinally extending splines circumferentially distributed on the head. The installation method preferably includes the steps of forming an opening in the sheet having a diameter less than a diameter defined by peripheral portions of the splines; driving the head of the clinch fastener into the opening to form a pilot surrounding the splines along a first portion of the head; and longitudinally displacing portions of the splines from along a second portion of the head to form a second laterally extending flange abutting the pilot and cooperating with the first flange to secure the clinch fastener within the sheet.

The step of driving the head of the clinch fastener preferably includes driving same so that the first flange adjacent the shaft is flush with a surface of the sheet. The clinch fastener also preferably includes a tapered second end so that a further step of aligning the clinch fastener with the opening in the sheet may be performed by positioning the tapered second end partially extending into the opening. In addition, as would be readily understood by those skilled in the art, dies or other tooling may be provided so that the steps of driving the head and forming the second, or locking flange may be performed simultaneously.

BRIEF DESCRIPTION OF THE DRAWINGS

FIG. 1 is an exploded perspective view of a male clinch fastener according to the invention installed in a metal sheet for use in securing a second sheet thereto.

FIG. 2 is a greatly enlarged exploded perspective view of the male clinch faster according to the invention prior to its installation within the opening in the sheet.

FIG. 3 is a greatly enlarged fragmentary perspective view, partially in section, illustrating the male clinch fastener according to the invention installed in the sheet.

FIG. 4 is a greatly enlarged side elevational view of the male clinch fastener according to the invention.

FIG. 5 is a greatly enlarged plan view of the male clinch fastener according to the invention.

FIG. 6 is a greatly enlarged bottom view of the male clinch fastener according to the invention.

FIGS. 7–8 are schematic views, partially in section, illustrating a method of installing the male clinch fastener according to the invention.

FIG. 10 is a side elevational view, partially in section, illustrating the male clinch fastener installed in the metal sheet according to the invention.

FIG. 11 is a side elevational view, partially in section, illustrating the male clinch fastener being used to secure a second sheet to the first sheet in which the male clinch fastener according to the invention is installed.

DETAILED DESCRIPTION OF THE PREFERRED EMBODIMENTS

Figure 12:
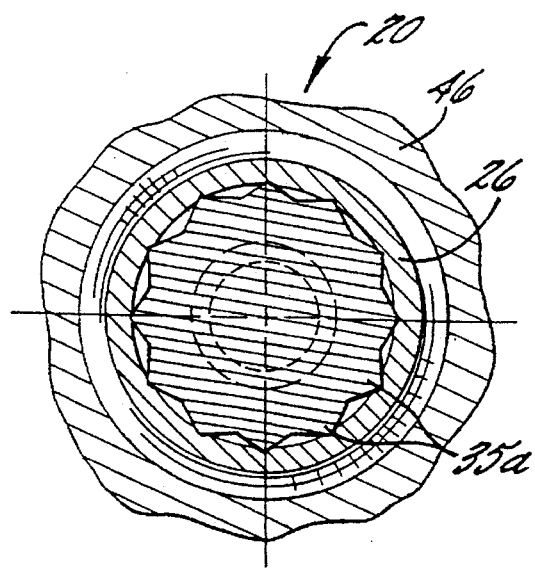
FIG. 12 is a greatly enlarged cross-sectional view taken along lines 12—12 of FIG. 9.

The present invention will now be described more fully hereinafter with reference to the accompanying drawings, in which preferred embodiments of the invention are shown. This invention may, however, be embodied in many different forms and should not be construed as limited to the embodiments set forth herein; rather, applicant provides these embodiments so that this disclosure will be thorough and complete, and will fully convey the scope of the invention to those skilled in the art. Prime notation is used to indicate like elements in alternate embodiments.

Referring first to FIG. 1, the male clinch fastener, or clinch bolt, 20 according to the invention is shown installed in a first sheet 21. The clinch bolt 20 is typically used to capture a threaded bore 24 of a mating female fastener, or nut, 23, such as for securing a second sheet 22 to the first sheet 21 as shown. Those skilled in the art will readily appreciate many applications for the clinch bolt 20 according to the invention, particularly in the area of industrial products and, more particularly, for use in automobiles.

Referring now additionally to FIGS. 2–6, the clinch bolt 20 according to the invention is further described. The clinch bolt 20 includes a generally cylindrical head 30 having a threaded shaft 31 adapted to be received in the threaded bore 24 of a mating fastener 23. The clinch bolt 20 also includes a first laterally extending flange 33 connected to the head 30 at a first or upper end adjacent the shaft 31.

A plurality of circumferentially distributed splines 35 are connected to the head 30 and extend longitudinally therealong. First longitudinally extending portions of the splines 35a (FIG. 4) are adapted to be secured within a collar or pilot 26 formed in the sheet 21 to prevent rotation of the clinch bolt 20, thereby providing excellent torque-out performance. Second longitudinally extending portions of the splines 35b (FIG. 4) are adapted to be displaced longitudinally to form a second laterally extending locking flange 40 in a medial portion of the head 30 for securing the male clinch fastener 20 within the pilot 26 of the sheet 21. In other words, the first flange 33 and the second flange 40 cooperate to secure the clinch bolt 20 within the pilot 26 formed in the sheet 21, while providing high pull-through and push-out performance. Moreover, the male clinch fastener 20 can accommodate a range of sheet thicknesses and opening dimensions by varying the longitudinal position of the second or locking flange 40 along head 30 of the fastener.

As shown perhaps best in FIG. 4, the head 30 has a second end portion being tapered and having a smaller diameter transverse cross-section being axially outermost and a larger diameter transverse cross-section defined by peripheral portions of the splines 35. The taper angle β is preferably in the range of about 40°–50°, and more preferably about 45°. The tapered end of the head 30 serves several purposes including: guiding or centering the clinch bolt 20 in the opening 25 of the sheet 21 during installation, rolling or forming the sheet to form the pilot 26, and for facilitating peeling down or shaving a portion of the splines 35 longitudinally to produce the cold-formed flange 40, as also described in greater detail below.

The first flange 33 at the first end of the head 30 has a tapered annular surface 37 transverse to the head for facilitating flush mounting of the flange with the upper surface of the sheet 21 (FIGS. 1 and 2). The taper angle α is preferably in the range of about 5°–10° (FIG. 2).

As would be readily understood by those skilled in the art, the clinch bolt 20 according to the present invention is preferably an integrally formed metal part that may be formed by conventional metal stamping and/or metal machining techniques. In other words, the head 30, the shaft 31, the first flange 33 and the splines 35 are preferably integrally formed of metal. In addition, after the clinch fastener 20 is installed, the second flange 40 is cold-formed metal displaced from the second portion of the head 30. The metal of the clinch bolt 20 is preferably selected from the group consisting of low carbon steel (Class 5), medium carbon steel (Class 9), and heat treated medium carbon steel (Class 10). The sheet 21 may preferably be metal, however, the sheet may also be plastic, such as polyethylene, as would be readily understood by those skilled in the art.

The splines 35 extending along the head 30 are regularly spaced and generally define a polygonal transverse cross-sectional shape. In addition, the cross-sectional shape of the splines may be generally uniform but for the tapered end, to thereby provide a more readily and inexpensively manufactured fastener. More preferably, the splines 35 may define a star-like transverse cross-sectional shape. This star-like pattern has relatively sharp outer edges, or points, and may be readily formed by conventional stamping techniques. For typical clinch bolt 20 sizes commonly used, the number of splines 35 is preferably in the range of about 8 to 16, and more preferably about 12. A small number of splines may tend to crack or damage the pilot 26 formed in the sheet, while a relatively large number of splines may provide reduced torque-out performance.

Referring now briefly to FIG. 16, an alternate embodiment of a clinch bolt 20' having a slightly different spline 35' configuration is illustrated. In this embodiment the splines 35' define a serpentine, or sinuous, generally circular transverse cross-sectional shape. In other words, the relatively sharp edges of the first illustrated embodiment are rounded to provide the serpentine or sinuous shape. The other portions of the second embodiment of the clinch bolt 20' are indicated by prime notation and are similar to the first embodiment as described above. Accordingly, this embodiment needs no further discussion. Those of skill in the art will readily appreciate other configurations of splines equivalent to those of the illustrated embodiments.

Now referring additionally to FIGS. 7–15, the method of installing the clinch bolt 20 according to the invention, as well as other features and advantages of the present invention are explained. As shown in FIG. 7, the clinch bolt 20 is centered over an opening 25 formed in the sheet 21. More particularly, the shaft 31 of the fastener 20 is captured within an opening in an upper press 45. Moreover, the tapered second end of the head 30 facilitates aligning or centering of the clinch bolt 20 over the opening 25 in the sheet 21 and facilitates formation of the pilot 26.

The opening 25 in the sheet 21 is preferably of a smaller diameter than the diameter of an imaginary circle defined by peripheral portions of the splines 35. In addition, the number of splines, typically 816, and their shape, allow the clinch bolt 20 to be installed without regard to its rotational orientation with respect to the opening. As shown in the illustrated embodiment, the apparatus includes the upper movable press 45, a generally cylindrical lower die body 46, and a sleeve 48 positioned within the die body. The relative vertical position of the sleeve 48 is preferably adjustable, such as to accommodate different sheet 21 thicknesses.

As shown in FIG. 8, as the upper press 45 is lowered, it forces the bolt 20 into the opening 25 of the sheet, thus deforming or bending down edge portions of the sheet adjacent the opening. In FIG. 9, the upper press 45 has completed its stroke and the clinch bolt 20 is positioned within the pilot 26 simultaneously formed in the sheet 21.

During the downward stroke of the press 45, the tapered end of the clinch bolt 20 contacts the shoulder defined by the sleeve 48. Thus, longitudinally extending portions of the splines 35b from along a second portion of the head 30 are displaced or peeled upwardly to form the second, or locking, flange 40 in the medial portion of the head and abutting end portions of the pilot 26. As would be readily understood by those skilled in the art, this cold-forming displacement of the metal to form the second, or locking, flange 40 produces a harder metal portion.

The head 30, when driven into the sheet, has a second portion extending longitudinally outward from the second flange 40. The second portion has a transverse cross-sectional diameter less than a predetermined diameter defined by peripheral portions of the splines 35. The second portion of the head 30 also includes a plurality of circumferentially distributed longitudinally extending grooves 43 (FIGS. 10, 11 and 14) in alignment with respective grooves defined between the plurality of splines 35a on the first portion of the head. In other words, the grooves 43 are vestiges of the displaced spline portions.

As a brief summary, the installation method preferably includes the steps of forming an opening 25 in the sheet 21 having a diameter less than a diameter defined by peripheral portions of the splines 35; driving the head 30 of the clinch bolt 20 into the opening to form a pilot 26 surrounding the splines along a first portion of the head; and longitudinally displacing portions of the splines 35b along a second portion of the head to form a second laterally extending flange 40 abutting the pilot and cooperating with the first flange 33 to secure the clinch bolt to the sheet.

The step of driving the head 30 of the clinch bolt 20 preferably includes driving the bolt so that the first flange 33 adjacent the shaft 31 is flush with a surface of the sheet. The clinch bolt 20 also preferably includes a tapered second end as shown in the illustrated embodiment so that a further step of aligning the clinch fastener with the opening 25 in the sheet 21 may be performed by positioning the tapered second end partially extending into the opening. In addition, the steps of driving the head 30 and forming the second flange 40 may be performed simultaneously as shown in FIG. 7–9.

Figure 13:
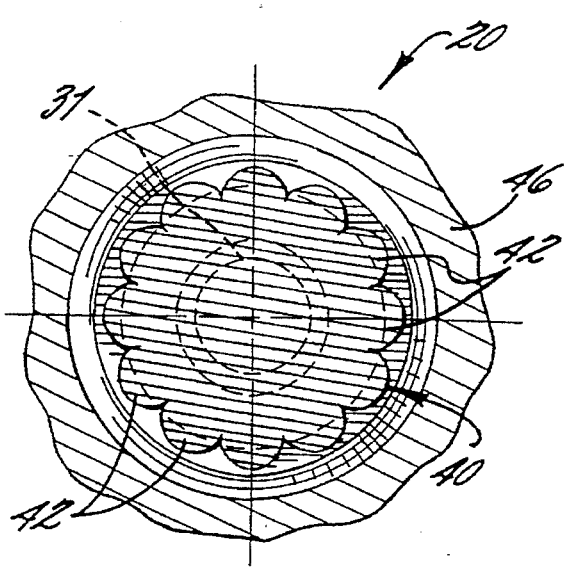
FIG. 13 is a greatly enlarged cross-sectional view taken along lines 13—13 of FIG. 9.
Figure 14:
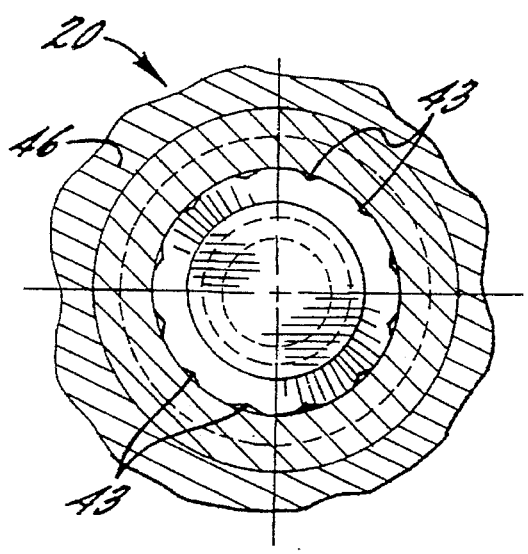
FIG. 14 is a greatly enlarged cross-sectional view taken along lines 14—14 of FIG. 9.
Figure 15:
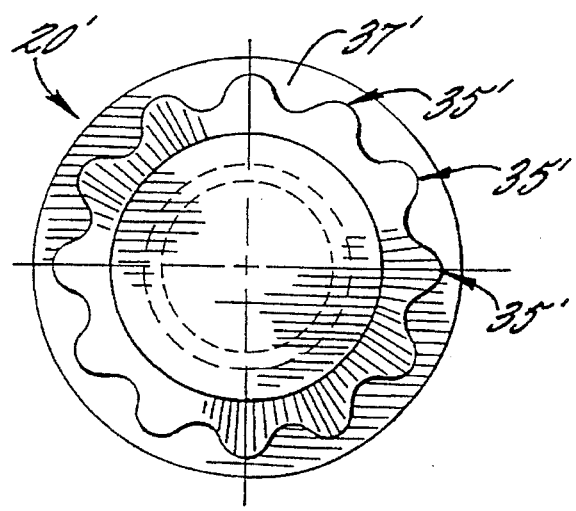
FIG. 15 is a greatly enlarged bottom view, similar to FIG. 6, but illustrating an alternate embodiment of splines of the male clinch fastener according to the invention.

As shown perhaps best in the cross-sectional view of FIG. 13, the second, or locking, flange 40 includes a plurality of radially outwardly extending protrusions 42 longitudinally aligned with respective splines 35a. These protrusions 42 typically have a generally bulbous shape as shown in the illustrated embodiment. The bulbous shape is formed as the metal is displaced upwardly and pinched between end portions of the pilot 26 and the die sleeve 48. The protrusions 42 may have a fairly regular shape and spacing as shown in the illustrated embodiment, while those of skill in the art will readily appreciate that other shapes and configurations may be formed, primarily depending on the shape and spacing of the splines 35.

Another aspect of the present invention highlighted by FIG. 12 is that the peripheral edges of the splines 35 have a tendency to dig into adjacent portions of the pilot 26 to prevent relative rotation of the clinch fastener 20 and the pilot 26. Accordingly, the clinch bolt 20 of the present invention enjoys high torque-out performance.

Many modifications and other embodiments of the invention will come to the mind of one skilled in the art having the benefit of the teachings presented in the foregoing descriptions and the associated drawings. For example, the head of the bolt shown in the illustrated embodiments has a generally circular cylindrical shape, while those skilled in the art will appreciate that other geometries, such as generally rectangular or square, may also be used. Therefore, it is to be understood that the invention is not to be limited to the specific embodiments disclosed, and that modifications and embodiments are intended to be included within the scope of the appended claims.

That which is claimed is:

1. A combination of a male clinch fastener secured to a sheet, the sheet having an opening with edge portions of said sheet adjacent the opening being deformed to define a pilot depending from said sheet, said clinch fastener comprising:

a generally cylindrical head and a shaft connected to said head and extending outwardly therefrom;

first and second laterally extending flanges connected to said head in longitudinally spaced relation and cooperating to secure said head within said pilot of said sheet, said first flange connected to a first end of said head adjacent said shaft, said first flange being located within said opening in said sheet, the outward surface of said flange adjacent said shaft being coplanar with the edge of said opening to allow an object attached to said shaft to be mounted flush against said sheet, said second flange connected to a medial portion of said head and abutting outer end portions of said pilot; and a plurality of circumferentially distributed splines connected to a first portion of said head and extending longitudinally between said first and second flanges, said splines in engagement with said pilot to prevent rotation of said clinch fastener within said pilot, said splines having peripheral portions defining an imaginary circle having a predetermined diameter;

said head having a second portion extending longitudinally outward from said second flange, said second portion having a transverse cross-sectional diameter less than said predetermined diameter defined by peripheral portions of said splines.

2. A combination according to claim 1 wherein said head, said shaft, said first flange and said splines are integrally formed of metal; and wherein said second flange comprises cold-formed metal displaced from said second portion of said head.

3. A combination according to claim 1 wherein said second portion of said head includes a plurality of circumferentially distributed longitudinally extending grooves in alignment with respective grooves defined by said plurality of splines on said first portion of said head.

4. A combination according to claim 1 wherein said second flange comprises a plurality of radially outwardly extending protrusions longitudinally aligned with respective splines.

5. A combination according to claim 1 wherein a second end portion of said head is tapered.

6. A combination according to claim 1 wherein said first flange is positioned flush with a surface of said sheet opposite the pilot.

7. A combination according to claim 6 wherein said first flange has an inwardly tapered annular surface transverse to said head for facilitating flush mounting of said first flange with said sheet.

8. A combination according to claim 1 wherein said plurality of splines define a polygonal transverse cross-sectional shape.

9. A combination according to claim 1 wherein said plurality of splines define a star-like transverse cross-sectional shape.

10. A combination according to claim 1 wherein said plurality of splines define a serpentine generally circular transverse cross-sectional shape.

11. A combination according to claim 1 wherein said plurality of splines is a predetermined number in a range of about 8 to 16.

12. A combination according to claim 1 wherein said opening in said sheet is generally circular.

13. A combination according to claim 1 wherein said sheet comprises metal.

14. A combination of a male clinch fastener secured to a sheet, the sheet having opposing first and second surfaces and an opening therethrough with portions of said sheet adjacent the opening being deformed to define a pilot depending from the second surface of said sheet, said clinch fastener comprising:

a generally cylindrical head and a shaft connected to said head and extending outwardly therefrom;

first and second laterally extending flanges connected to said head in longitudinally spaced relation and cooperating to secure said head within said pilot of said sheet, the first flange connected to a first end of said head adjacent said shaft, said first flange being located within said opening in said sheet, the outward surface of said flange adjacent said shaft being coplanar with the edge of said opening to allow an object attached to said shaft to be positioned flush with the first surface of said sheet, the second flange connected to a medial portion of said head and abutting outer end portions of said pilot; and a plurality of circumferentially distributed splines connected to a first portion of said head and extending longitudinally between said first and second flanges, said splines in engagement with said pilot to prevent rotation of said clinch fastener within said pilot, said splines define a star-like transverse cross-sectional shape, said splines having peripheral portions defining an imaginary circle having a predetermined diameter;

said head having a second portion extending longitudinally outward from said second flange, said second portion having a transverse cross-sectional diameter less than said predetermined diameter defined by peripheral portions of said splines.

15. A combination according to claim 14 wherein said head, said shaft, said first flange and said splines are integrally formed of metal; and wherein said second flange comprises cold-formed metal displaced from said second portion of said head.

16. A combination according to claim 14 wherein said second portion of said head includes a plurality of circumferentially distributed longitudinally extending grooves in alignment with respective grooves defined by said plurality of splines on said first portion of said head.

17. A combination according to claim 14 wherein said second flange comprises a plurality of radially outwardly extending protrusions longitudinally aligned with respective splines.

18. A combination according to claim 14 wherein a second end portion of said head is tapered.

19. A combination according to claim 14 wherein said first flange has an inwardly tapered annular surface transverse to said head for facilitating flush mounting of said first flange with said sheet.

20. A combination according to claim 14 wherein said plurality of splines is a predetermined number in a range of about 8 to 16.

21. A combination according to claim 14 wherein said sheet comprises metal, and wherein the opening in said metal sheet is generally circular.

22. A combination of a male clinch fastener secured to a sheet, the sheet having opposing first and second surfaces and an opening therethrough with edge portions of said sheet adjacent the opening being deformed to define a pilot depending from the second surface of said sheet, said clinch fastener comprising:

a generally cylindrical head having a shaft connected to said head and extending outwardly therefrom;

first and second laterally extending flanges connected to said head in longitudinally spaced relation and cooperating to secure said head within said pilot of said sheet, the first flange connected to a first end of said head adjacent said shaft, said first flange being located within said opening in said sheet, the outward surface of said flange adjacent said shaft being coplanar with the edge of said opening to allow an object attached to said shaft to be positioned flush with the first surface of said sheet, the second flange connected to a medial portion of said head and abutting outer end portions of said pilot; and a plurality of circumferentially distributed splines connected to a first portion of said head and extending longitudinally between said first and second flanges, said splines in engagement with said pilot to prevent rotation of said clinch fastener within said pilot, said splines defining a serpentine generally circular transverse cross-sectional shape, said splines having peripheral portions defining an imaginary circle having a predetermined diameter;

said head having a second portion extending longitudinally outward from said second flange, said second portion having a cross-sectional diameter less than said predetermined diameter defined by peripheral portions of said splines.

23. A combination according to claim 22 wherein said head, said shaft, said first flange and said splines are integrally formed of metal; and wherein said second flange comprises cold-formed metal displaced from said second portion of said head.

24. A combination according to claim 22 wherein said second portion of said head includes a plurality of circumferentially distributed longitudinally extending grooves in alignment with respective grooves defined by said plurality of splines on said first portion of said head.

25. A combination according to claim 22 wherein said second flange comprises a plurality of radially outwardly extending protrusions longitudinally aligned with respective splines.

26. A combination according to claim 22 wherein a second end portion of said head is tapered.

27. A combination according to claim 22 wherein said first flange has an inwardly tapered annular surface transverse to said head for facilitating flush mounting of said first flange with said sheet.

28. A combination according to claim 22 wherein said plurality of splines is a predetermined number in a range of about 8 to 16.

29. A combination according to claim 22 wherein said sheet comprises metal, and wherein the opening in said metal sheet is generally circular.

30. A male clinch fastener adapted to be secured to a sheet by cold-forming, said clinch fastener comprising:

a generally cylindrical head having a shaft connected thereto and extending outwardly therefrom;

a first laterally extending flange connected to a first end of said head adjacent said shaft; and a plurality of circumferentially distributed splines connected to said head and extending longitudinally therealong, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said head for securing said clinch fastener within the pilot of the sheet;

said head having a second end portion being tapered and having a smaller diameter transverse cross-section being axially outermost and a larger diameter transverse cross-section defined by peripheral portions of said splines, said second end portion being adapted to form the pilot in the sheet;

said first flange having a first surface facing toward said shaft and a second surface facing toward said second flange, said second surface being tapered to facilitate entry of said first flange into the pilot so that said first surface is flush with the sheet.

31. A clinch fastener according to claim 30 wherein said shaft is threaded.

32. A clinch fastener according to claim 30 wherein said head, said shaft, said first flange and said splines are integrally formed of metal.

33. A clinch fastener according to claim 32 wherein said metal is selected from the group consisting of low carbon steel, medium carbon steel, and heat treated medium carbon steel.

34. A clinch fastener according to claim 30 wherein said first flange has an inwardly tapered annular surface transverse to said head for facilitating flush mounting of said first flange with the sheet.

35. A clinch fastener according to claim 30 wherein said plurality of splines define a polygonal transverse cross-sectional shape.

36. A clinch fastener according to claim 30 wherein said plurality of splines define a star-like transverse cross-sectional shape.

37. A clinch fastener according to claim 30 wherein said plurality of splines define a serpentine generally circular transverse cross-sectional shape.

38. A clinch fastener according to claim 30 wherein said plurality of splines is a predetermined number in a range of about 8 to 16.

39. A male clinch fastener adapted to be secured to a sheet by cold-forming, said clinch fastener comprising:

a generally cylindrical metal head and an integrally formed metal shaft extending outwardly from said head;

a first laterally extending metal flange integrally formed with said cylindrical metal head at a first end thereof adjacent said shaft;

a plurality of circumferentially distributed metal splines integrally formed with said cylindrical metal head and extending longitudinally therealong, said splines defining a star-like transverse cross-sectional shape, said splines having peripheral portions defining an imaginary circle having a predetermined diameter, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said head for securing said clinch fastener within the pilot of the sheet, said second end portion being adapted to form the pilot in the sheet;

said first flange having a first surface facing toward said shaft and a second surface facing toward said second flange, said second surface being tapered to facilitate entry of said first flange into the pilot so that said first surface is flush with the sheet.

40. A clinch fastener according to claim 39 wherein said shaft is threaded.

41. A clinch fastener according to claim 39 wherein said metal is selected from the group consisting of low carbon steel, medium carbon steel, and heat treated medium carbon steel.

42. A clinch fastener according to claim 39 wherein said first flange has an inwardly tapered annular surface transverse to said head for facilitating flush mounting of said first flange with the sheet.

43. A clinch fastener according to claim 39 wherein said plurality of splines is a predetermined number in a range of about 8 to 16.

44. A male clinch fastener adapted to be secured to a sheet by cold-forming, said clinch fastener comprising:

a generally cylindrical metal head and an integrally formed metal shaft extending outwardly from said head;

a first laterally extending metal flange integrally formed with said cylindrical metal head at a first end thereof adjacent said shaft;

a plurality of circumferentially distributed metal splines integrally formed with said cylindrical metal head and extending longitudinally therealong, said splines defining a generally circular serpentine transverse cross-sectional shape, said splines having peripheral portions defining an imaginary circle having a predetermined diameter, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said head for securing said clinch fastener within the pilot of the sheet;

said head having a second end portion being tapered and having a smaller diameter portion being axially outermost and a larger diameter portion defined by peripheral portions of said splines, said second end portion being adapted to form the pilot in the sheet;

said first flange having a first surface facing toward said shaft and a second surface facing toward said second flange, said second surface being tapered to facilitate entry of said first flange into the pilot so that said first surface is flush with the sheet.

45. A clinch fastener according to claim 44 wherein said shaft is threaded.

46. A clinch fastener according to claim 44 wherein said metal is selected from the group consisting of low carbon steel, medium carbon steel, and heat treated medium carbon steel.

47. A clinch fastener according to claim wherein said first flange has an inwardly tapered annular surface transverse to said head for facilitating flush mounting of said first flange with the sheet.

48. A clinch fastener according to claim 44 wherein said plurality of splines is a predetermined number in a range of about 8 to 16.

49. A method for securing a male clinch fastener to a sheet, the clinch fastener including a head and a shaft extending outwardly therefrom, the head having a first laterally extending flange at an end thereof adjacent said shaft and a plurality of longitudinally extending splines circumferentially distributed on the head, the method comprising the steps of:

forming an opening in the sheet having a diameter less than a diameter defined by peripheral portions of the splines;

driving the head of the clinch fastener into the opening to form a pilot from edge portions of the sheet so that the pilot surrounds the splines along a first longitudinal portion of the head; and longitudinally displacing portions of the splines from along a second longitudinal portion of the head to form a second laterally extending flange abutting the pilot and cooperating with the first flange to secure the clinch fastener to the sheet.

50. A method according to claim 49 wherein the step of driving the head comprises driving same so that the first flange is flush with a surface of the sheet.

51. A method according to claim 49 wherein the clinch fastener includes a tapered second end, and further comprising the step of aligning the clinch fastener with the opening in the sheet by positioning the tapered second end partially extending into the opening.

52. A method according to claim 49 wherein the steps of driving the head and forming the second flange are performed simultaneously.

\* \* \* \* \*